Patented Apr. 18, 1933　　　　　　　　　　　　　　　　　　　　1,904,696

UNITED STATES PATENT OFFICE

GUSTAVE ROY, OF BELLEVUE (SEINE ET OISE), FRANCE

PREPARATION OF STABLE SOLUTIONS OF HALOGENATED ACETYLCHOLIN SALTS

No Drawing.　Application filed December 2, 1930, Serial No. 499,539, and in Great Britain January 13, 1930.

Remedies which cannot be taken by the mouth are administered in the form of subcutaneous injections. The subcutaneous injection of many therapeutical agents, however, causes painful and sometimes dangerous reactions, irritations, fever, or even mortification of the tissue. This prevents the use in therapeutics of many compounds which cannot be taken by the mouth, and which would be otherwise beneficial.

It follows that it is not sufficient for a therapeutic agent which cannot be taken by the mouth to be effective against disease, it must also be capable of being tolerated 'y the patient, without objectionable after effects, when administered in the form of subcutaneous injections.

Acetylcholin salts are the most powerful vasodilatating agents known actually (see Dale: Jour. Pharm. and Exp. Therap. vol. VI p. 147 (1914) and Jour. Physiology vol. 48 p. 111 (1914)). These salts are used with good results in numerous accidents caused by hypertension: restrictive arteritis of the limbs (Raynaud's disease), spasms of various kinds (cerebral, retinian, auricular) neuro-vegetative troubles (hypovagotony). They are also very useful to oppose the perspiration of tuberculosis patients. The treatment t. all these diseases must be performed by injection, which explains the utility of providing doctors with a ready-made stable and sterilizable solution. Now, acetylcholin salts, and specially the halogenated salts, are very unstable in presence of water, particularly at temperatures above normal. Applicant's invention is based on the fact that the solutions of these salts in polyalcohols incompletely esterified with acetic acid are stable even at the temperature to which they must be raised for sterilization and that they are tolerated by the living human body without objectionable after effects.

It is known that acetylcholin salts, and particularly halogenated acetylcholin salts are very unstable in presence of moisture, particularly at a raised temperature (see, for example, Fraenkel: Arzneimittel Synthese, 6th Ed. p. 336). This is a very objectionable feature which has prevented hitherto the preparation of sterilized solutions suitable for being injected.

I have found that halogenated acetylcholin salts are soluble in polyalcohols incompletely esterified with acetic acid, such as, for example, ethylene glycol monoacetin or glycerine mono or diacetin, and that the solutions so obtained can be sterilized and preserved without any alteration of their physiological properties.

It might have been expected that the ethers produced by the partial etherification of the polyalcohols would cause painful reactions, or even mortification of the tissues, when injected subcutaneously. I have found, on the contrary, that these compounds are perfectly tolerated by patients, so that no objection arises to their use for intramuscular injections.

*Example.*—12.5 grammes acetylcholin bromide are dissolved in a mixture of glycerin mono- and di-acetin, containing 60 per cent of the former compound and 40 per cent of the latter, such a quantity of the mixture being taken that the volume of the solution obtained is 100 cc.

The solution is distributed in ampullæ of ½ or 1 cc. which are sealed in the usual way and sterilized by heating in an autoclave.

The sterilized solution is as active as the initial solution, and it has excellent stability and preserving capability.

What I claim and desire to secure by Letters Patent is:—

1. A process for stabilizing and preserving halogenated acetylcholin salts without any alteration of their physiological properties, consisting in dissolving the halogenated acetylcholin salts in a polyalcohol incompletely esterified with acetic acid.

2. A process for stabilizing and preserving halogenated acetylcholin salts without any alteration of their physiological properties, consisting in dissolving the halogenated acetylcholin salts in ethylene glycol monoacetin.

3. A process for stabilizing and preserving halogenated acetylcholin salts without any alteration of their physiological properties, consisting in dissolving the halogenated acetylcholin salts in glycerine monoacetin.

4. A process for stabilizing and preserving halogenated acetylcholin salts without any alteration of their physiological properties, consisting in dissolving the halogenated acetylcholin salts in glycerine diacetin.

5. As new composition of matter, a polyalcohol incompletely esterified with acetic acid, containing a halogenated acetylcholin salt in solution and having the property that it is stable and can be sterilized and preserved without any alteration of the physiological properties of the halogenated acetylcholin salt.

6. As new composition of matter, ethylene glycol mono-acetin containing a halogenated acetylcholin salt in solution and having the property that it is stable and can be sterilized and preserved without any alteration of the physiological properties of the halogenated acetylcholin salt.

7. As new composition of matter, glycerine mono-acetin containing a halogenated acetylcholin salt in solution and having the property that it is stable and can be sterilized and preserved without any alteration of the physiological properties of the halogenated acetylcholin salt.

8. As new composition of matter, glycerine diacetin containing a halogenated acetylcholin salt in solution and having the property that it is stable and can be sterilized and preserved without any alteration of the physiological properties of the halogenated acetylcholin salt.

In testimony whereof I have signed my name to this specification.

GUSTAVE ROY.

CERTIFICATE OF CORRECTION.

Patent No. 1,904,696.  April 18, 1933.

GUSTAVE ROY.

It is hereby certified that the above numbered patent was erroneously issued to the inventor said "Roy," whereas said patent should have been issued to "Societe Des Usines Chimiques Rhone-Poulenc, of Paris, France, a Body corporate of France", as assignee of the entire interest in said invention, as shown by the records of assignments in this office; and that the said Letters Patent should be read with this correction therein that the same may conform to the record of the case in the Patent Office.

Signed and sealed this 23rd day of May, A. D. 1933.

M. J. Moore.

(Seal)  Acting Commissioner of Patents.

ed acetylcholin salts in glycerine monoacetin.

4. A process for stabilizing and preserving halogenated acetylcholin salts without any alteration of their physiological properties, consisting in dissolving the halogenated acetylcholin salts in glycerine diacetin.

5. As new composition of matter, a polyalcohol incompletely esterified with acetic acid, containing a halogenated acetylcholin salt in solution and having the property that it is stable and can be sterilized and preserved without any alteration of the physiological properties of the halogenated acetylcholin salt.

6. As new composition of matter, ethylene glycol mono-acetin containing a halogenated acetylcholin salt in solution and having the property that it is stable and can be sterilized and preserved without any alteration of the physiological properties of the halogenated acetylcholin salt.

7. As new composition of matter, glycerine mono-acetin containing a halogenated acetylcholin salt in solution and having the property that it is stable and can be sterilized and preserved without any alteration of the physiological properties of the halogenated acetylcholin salt.

8. As new composition of matter, glycerine diacetin containing a halogenated acetylcholin salt in solution and having the property that it is stable and can be sterilized and preserved without any alteration of the physiological properties of the halogenated acetylcholin salt.

In testimony whereof I have signed my name to this specification.

GUSTAVE ROY.

CERTIFICATE OF CORRECTION.

Patent No. 1,904,696.           April 18, 1933.

GUSTAVE ROY.

It is hereby certified that the above numbered patent was erroneously issued to the inventor said "Roy," whereas said patent should have been issued to "Societe Des Usines Chimiques Rhone-Poulenc, of Paris, France, a Body corporate of France", as assignee of the entire interest in said invention, as shown by the records of assignments in this office; and that the said Letters Patent should be read with this correction therein that the same may conform to the record of the case in the Patent Office.

Signed and sealed this 23rd day of May, A. D. 1933.

M. J. Moore.

(Seal)                    Acting Commissioner of Patents.

CERTIFICATE OF CORRECTION.

Patent No. 1,904,696.    April 18, 1933.

GUSTAVE ROY.

It is hereby certified that the above numbered patent was erroneously issued to the inventor said "Roy," whereas said patent should have been issued to "Societe Des Usines Chimiques Rhone-Poulenc, of Paris, France, a Body corporate of France", as assignee of the entire interest in said invention, as shown by the records of assignments in this office; and that the said Letters Patent should be read with this correction therein that the same may conform to the record of the case in the Patent Office.

Signed and sealed this 23rd day of May, A. D. 1933.

M. J. Moore.

(Seal)    Acting Commissioner of Patents.